United States Patent
Liu et al.

(10) Patent No.: US 9,013,436 B2
(45) Date of Patent: Apr. 21, 2015

(54) TOUCH DEVICE

(71) Applicants: Yung-Lung Liu, Hsin-Chu (TW);
Hsien-Ming Chen, Hsin-Chu (TW);
Chwen-Tay Hwang, Hsin-Chu (TW)

(72) Inventors: Yung-Lung Liu, Hsin-Chu (TW);
Hsien-Ming Chen, Hsin-Chu (TW);
Chwen-Tay Hwang, Hsin-Chu (TW)

(73) Assignee: Young Lighting Technology Inc.,
Hsin-Chu (TW)

( * ) Notice: Subject to any disclaimer, the term of this patent is extended or adjusted under 35 U.S.C. 154(b) by 13 days.

(21) Appl. No.: 14/103,846

(22) Filed: Dec. 12, 2013

(65) Prior Publication Data

US 2014/0253828 A1 Sep. 11, 2014

(30) Foreign Application Priority Data

Mar. 6, 2013 (TW) .............................. 102107929 A

(51) Int. Cl.
*G06F 3/041* (2006.01)
*G06F 3/047* (2006.01)

(52) U.S. Cl.
CPC ...................................... *G06F 3/047* (2013.01)

(58) Field of Classification Search
None
See application file for complete search history.

(56) References Cited

U.S. PATENT DOCUMENTS

| 2010/0059294 A1 | 3/2010 | Elias et al. |
| 2010/0144391 A1 | 6/2010 | Chang et al. |
| 2011/0025639 A1 | 2/2011 | Trend et al. |
| 2012/0227259 A1 | 9/2012 | Badaye et al. |

FOREIGN PATENT DOCUMENTS

| CN | 101566895 | 10/2009 |
| TW | 200945149 | 11/2009 |
| TW | 201314519 | 4/2013 |

OTHER PUBLICATIONS

"Office Action of Taiwan Counterpart Application", issued on Nov. 13, 2014, p. 1-p. 3.

*Primary Examiner* — Nicholas Lee
(74) *Attorney, Agent, or Firm* — Jianq Chyun IP Office

(57) ABSTRACT

A touch device includes a circuit board, a substrate and a touch-sensing layer. The touch-sensing layer including patterned electrode sets is disposed on the substrate. Each patterned electrode set includes a driving electrode connected to the circuit board and sensing electrodes having wiring lines connected to the circuit board. The wiring lines of each patterned electrode set include first and second groups. The length for one of the wiring lines in the first group is greater than the length for one of the wiring lines in the second group. Diameters of the wiring lines in the first group are greater than diameters of the wiring lines in the second group. The diameter of the longer wiring line is greater than the diameter of the shorter wiring line, in the first group. The diameters in the second group are identical. The total widths of the first and second groups are equal.

10 Claims, 3 Drawing Sheets

TOUCH DEVICE

CROSS-REFERENCE TO RELATED APPLICATION

This application claims the priority benefit of Taiwan application serial no. 102107929, filed on Mar. 6, 2013. The entirety of the above-mentioned patent application is hereby incorporated by reference herein and made a part of this specification.

BACKGROUND

1. Technical Field

The invention relates to an electronic device, and more particularly, to a touch device.

2. Related Art

The conventional human-to-machine interface using keyboard is gradually incapable of meeting the demands from users, as electronic devices develop towards using multi-touch. Under such circumstances, touch devices have enjoyed burgeoning development. The operating method of touch devices could be more simple, convenient and intuitive, as compared to the operating method of the conventional operating interface using keyboard. Through the touch device, the user is capable of directly touching objects, menus or pictures on the screen with the finger or a stylus pen. Alternatively, the user could employ a variety of different gestures to operate these objects, menus or pictures.

For multi-touch devices, a touch-sensing layer with a single electrode layer has been developed in order to simplify the structure and meet the trend of slim and light handheld devices. However, the touch input sensing ability of the touch device is poor due to the high surface resistance of the current electrode material such as indium tin oxide (ITO). Accordingly, how to achieve a fine touch input sensing ability for the touch device with the single electrode layer is currently an important issue to be addressed in the related technical domain.

U.S. Patent Application Publication No. 2012/0227259A1 discloses a capacitive sensor array, in which the comb-shaped electrode and the E-shaped electrode thereof appear to be correspondingly disposed in the finger crossing manner. Taiwan Patent Application Publication No. 200945149 discloses a touch layer of a capacitive touch panel, in which the longer length of the signal electrode thereof has a greater width.

SUMMARY

The invention is directed to a touch device capable of achieving a fine touch input sensing ability.

Additional aspects and advantages of the present invention will be set forth in the description of the techniques disclosed in the invention.

To achieve one of or all aforementioned and other advantages, an embodiment of the invention provides a touch device including a circuit board, a substrate and a touch-sensing layer. The touch-sensing layer is disposed on the substrate, and includes a plurality of patterned electrode sets, in which each of the patterned electrode sets includes a driving electrode and a plurality of sensing electrodes. The driving electrode is electrically connected to the circuit board. The sensing electrodes are corresponded to the driving electrode. Each of the sensing electrodes has a wiring line, and the wiring line is electrically connected to the circuit board. The wiring lines of each patterned electrode set includes a first group and a second group, in which a length for any one of the wiring lines in the first group is greater than a length for any one of the wiring lines in the second group, a diameter for any one of the wiring lines in the first group is greater than a diameter for any one of the wiring lines in the second group, the diameter of the longer wiring line in the first group is greater than the diameter of the shorter wiring line in the first group, the diameters for the wiring lines in the second group are the same, and a total width of the first group equals to a total width of the second group.

In an embodiment of the invention, the driving electrode has a plurality of patterned notches. The sensing electrodes are respectively located within the patterned notches and surrounded by the driving electrode. A shape of each patterned notch is corresponded to a shape of each sensing electrode.

In an embodiment of the invention, each of the sensing electrodes is in a fish-bone shape.

In an embodiment of the invention, each of the patterned electrode sets is in a long-strip shape, and the sensing electrodes are arranged along a length direction of the patterned electrode set.

In an embodiment of the invention, the patterned electrode sets are arranged in parallel.

In an embodiment of the invention, any two of the wiring lines adjacent to each other in the first group have a gap, and the gaps in the first group are the same.

In an embodiment of the invention, any two of the wiring lines adjacent to each other in the second group have a gap, and the gaps in the second group are the same.

In an embodiment of the invention, an amount of the wiring lines in the first group is less than an amount of the wiring lines in the second group.

In an embodiment of the invention, materials of the driving electrode, the sensing electrodes and the wiring lines include indium tin oxide.

In an embodiment of the invention, a plurality of dummy patterns are disposed on the substrate and located at gaps between the patterned electrode sets.

According to the above descriptions, the embodiments of the invention at least have one of the advantages as follow. In the embodiments of the invention, the plurality of wiring lines in each of the patterned electrode sets are configured as described below, in order for the resistance of the longer wiring lines in each patterned electrode set without being too large. The plurality of the wiring lines in each patterned electrode set are divided into the first group and the second group, in which the length for any one of the wiring lines in the first group is greater than the length for any one of the wiring lines in the second group, the diameter for any one of the wiring lines in the first group is designed to be greater than the diameter for any one of the wiring lines in the second group, and the diameter of the longer wiring line in the first group is designed to be greater than the diameter of the shorter wiring line in the first group. By this way, the resistance of the longer wiring lines in each patterned electrode set could be effectively reduced through the increase of the diameter, so as to prevent the longer wiring lines to affect the correctness of transmitting the touch-sensing signal due to the overly large resistance. Additionally, the wiring lines in each patterned electrode set are located in the same touch-sensing layer with the sensing electrodes and the driving electrode. Accordingly, the total width of the first group is designed to be equal to the total width of the second group, in order to prevent the wiring lines causing any negative effects on the correctness of the touch-sensing, that is, the width of the non-sensing region constituted by the wiring lines of the first group is equal to the width of the non-sensing region constituted by the wiring lines of the second group. By this way, when the touch device performs the calculation and the determination, because of the widths for each non-sensing region in the touch-sensing layer are the same, the misjudgement of the touch recognition system caused by the inconsistent widths of the non-sensing regions could be reduced, and thus a preferable accuracy and efficiency could be achieved, thereby taking into account the correctness of transmitting the touch-sensing signal and the efficiency and accuracy of the touch recognition system.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
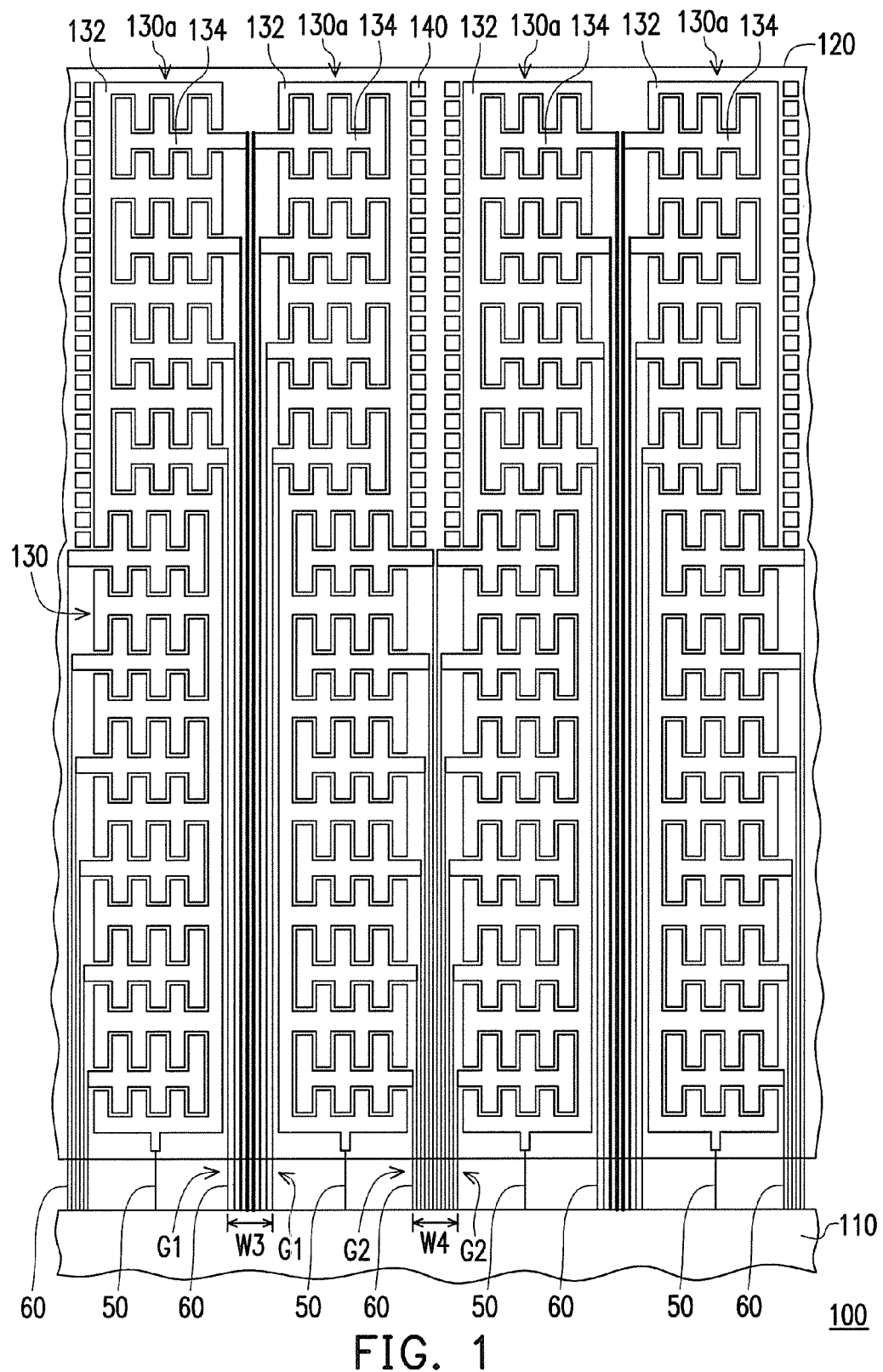
FIG. 1 is a partial schematic diagram illustrating a touch device according to an embodiment of the invention.

FIG. 1 is a partial schematic diagram illustrating a touch device according to an embodiment of the invention. Referring to FIG. 1, the touch device 100 of the embodiment is a touch device with the single-layer and multi-touch structure, for instance, which includes a circuit board 110, a substrate 120 and a touch-sensing layer 130. The touch-sensing layer 130 is disposed on the substrate 120, and includes a plurality of patterned electrode sets 130a, in which each of the patterned electrode sets 130a includes a driving electrode 132 and a plurality of sensing electrodes 134. The driving electrode 132 is electrically connected to the circuit board 110 through the wiring lines 50. The sensing electrodes 134 in each of the patterned electrode sets 130a are corresponded and adjacent to the driving electrode 132. Each of the sensing electrodes 134 has a wiring line 60, where the wiring line 60 is electrically connected to the circuit board 110. When the user performs the touch input on the touch-sensing layer 130, the sensing electrode 134 located where the user touches and the driving electrode 132 generate a touch signal, and the touch signal is transmitted to the circuit board 110 via the wiring lines 50 and 60.

Figure 2:
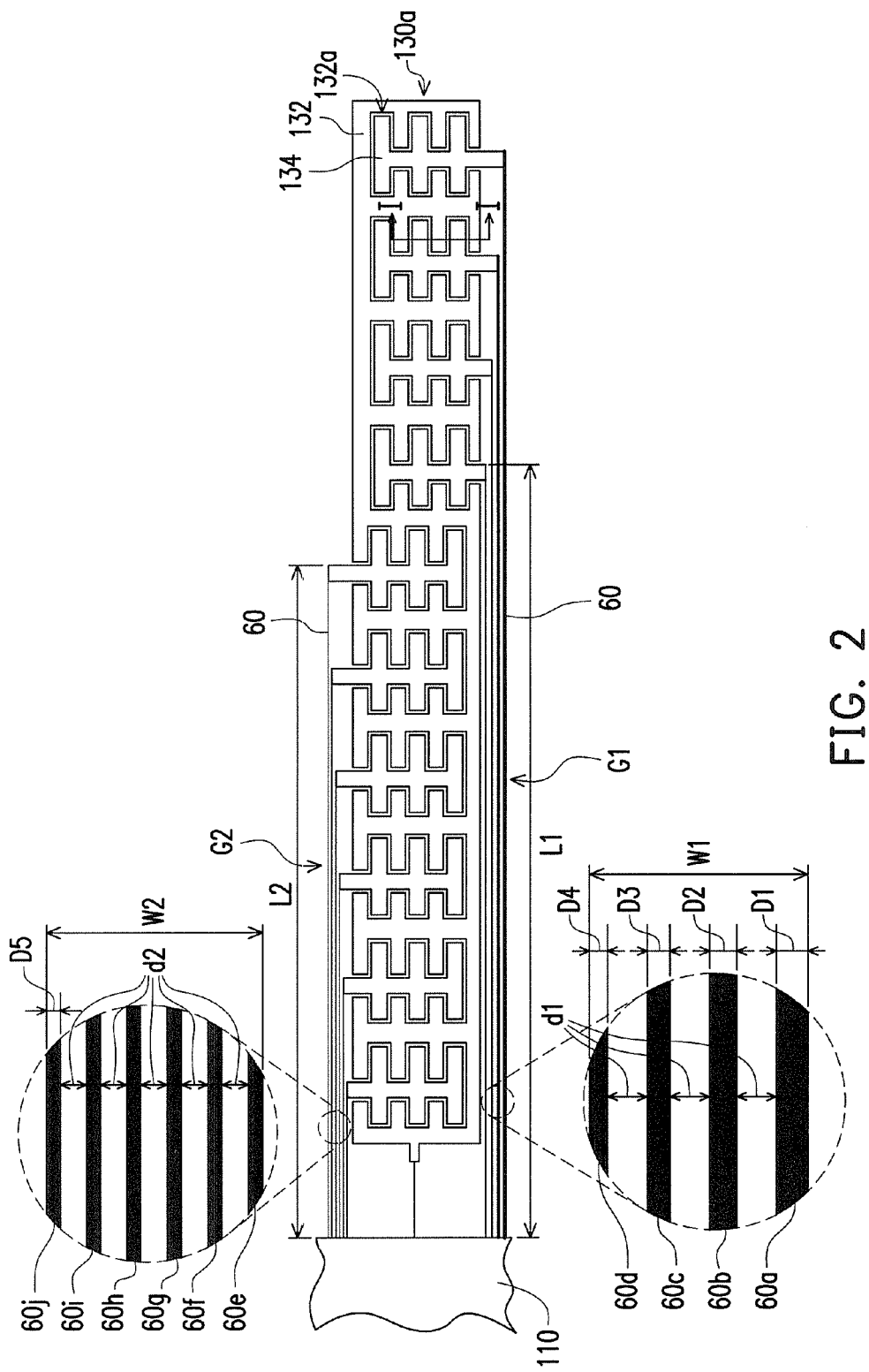
FIG. 2 is a partial schematic diagram illustrating the touch device depicted in FIG. 1.

FIG. 2 is a partial schematic diagram illustrating the touch device depicted in FIG. 1. For the clarity's sake, the wiring lines 60 of the first group G1 in one enlarged region are respectively labelled as 60a~60d and the wiring lines 60 of the second group G2 in another enlarged region are respectively labelled as 60e~60j in FIG. 2. In order for the resistance of the longer wiring lines 60 in each patterned electrode set 130a without being too large, the wiring lines 60 in each patterned electrode set 130a are configured as shown in FIG. 2 which is illustrated in detail as follows, thereby preventing the correctness of transmitting the touch-sensing signal being reduced.

Referring to FIG. 2, the wiring lines 60 in the patterned electrode set 130a are divided into the first group G1 and the second group G2, in which the length for any one of the wiring lines 60a~60d in the first group G1 is greater than the length for any one of the wiring lines 60e~60j in the second group G2. For example, the length L1 for the shortest wiring line 60d in the first group G1 is greater than the length L2 for the longest wiring line 60j in the second group G2. Additionally, the diameter for any one of the wiring lines 60a~60d in the first group G1 is designed to be greater than the diameter for any one of the wiring lines 60e~60j in the second group G2, where the diameter of the longer wiring line in the first group G1 is designed to be greater than the diameter of the shorter wiring line in the first group G1. In more detail, the longest wiring line 60a, the second longest wiring line 60b, the second shortest wiring line 60c and the shortest wiring line 60d in the first group G1 respectively have the diameters D1, D2, D3 and D4, whereas the wiring lines 60e~60j in the second group G2 all have the identical diameter D5, in which the diameter D1>the diameter D2>the diameter D3>the diameter D4>the diameter D5.

Under the afore-described configuration, the resistance of the longer wiring line 60 in each patterned electrode set 130a is capable of being reduced through the increase of the diameter, so as to prevent the longer wiring line 60 to affect the correctness of transmitting the touch-sensing signal due to the overly large resistance. Additionally, the wiring lines 60 in each of the patterned electrode sets 130a are located in the same touch-sensing layer 130 with the sensing electrodes 134 and the driving electrode 132. Accordingly, the total width W1 of the first group G1 is designed to be equal to the total width W2 of the second group G2, in order to prevent the wiring lines 60 causing any negative effects on the correctness of the touch-sensing, that is, the width W1 of the non-sensing region constituted by the wiring lines 60a~60d of the first group G1 is equal to the width W2 of the non-sensing region constituted by the wiring lines 60e~60j of the second group G2. In more detail, the width W3 of the non-sensing region constituted by two of the first groups G1 depicted in FIG. 1 is twice as large as the width W1 of the first group G1 depicted in FIG. 2, and the width W4 of the non-sensing region constituted by two of the second groups G2 depicted in FIG. 1 is twice as large as the width W2 of the second group G2 depicted in FIG. 2, and thus the width W3 is equal to the width W4 because the width W1 equals to the width W2. Accordingly, the widths of the non-sensing regions constituted by the wiring lines 60 in the touch-sensing layer 130 could be made all the same, such that the misjudgement of the touch recognition system caused by the inconsistent widths of the non-sensing regions could be reduced, and the degree of affecting the efficiency and accuracy through the non-sensing regions could then be reduced when the touch device 100 performs the calculation and the determination.

Under the circumstances that the diameters of the wiring lines 60a~60d in the first group G1 are all greater than the diameters of the wiring lines 60e~60j in the second group G2, in order to easily produce the width of the first group G1 equalling to the width of the second group G2 as described above to minimize the widths of the first and second groups G1 and G2, the amount of the wiring lines 60a~60d included in the first group G1 could be designed to be less than the amount of the wiring lines 60e~60j included in the second group G2. In the embodiment, the amount of the wiring lines included in the first group G1 and the amount of the wiring lines included in the second group G2 are respectively 4 and 6, for instance, although the invention is not limited thereto. In other embodiments, the wiring lines included in the first and second groups G1, G2 could respectively be other suitable numbers.

In the embodiment, any two of the wiring lines 60 adjacent to each other in the first group G1 have a gap d1, and the gaps d1 in the first group G1 are the same. Similarly, any two of the wiring lines 60 adjacent to each other in the second group G2 have a gap d2, and the gaps d2 in the second group G2 are the same. Moreover, since the lengths of the wiring lines 60e~60j in the second group G2 are shorted that less likely to affect the touch-sensing ability due to the overly large resistance of the wiring lines, the diameters of the wiring lines 60 in the second group G2 could be designed to be the same. Accordingly, the manufacturing process of the touch-sensing layer 130 could be simplified.

Referring to FIG. 1, the patterned electrode sets 130a of the embodiment are arranged in parallel. Each of the patterned electrode sets 130a is in a long-strip shape, and the sensing electrodes 134 are sequentially arranged along the length direction of the patterned electrode sets 130a, so that the touch-sensing layer 130 is constituted. Referring to FIG. 2, in more detail, the driving electrode 132 of the embodiment has a plurality of patterned notches 132a. The sensing electrodes 134 are respectively located within the patterned notches 132a and surrounded by the driving electrode 132. Each of the sensing electrodes 134 is in a fish-bone shape, for instance. The shape of each of the patterned notches 132a is corresponded to the shape of each of the sensing electrodes 134. As such, when the user touches a region of the patterned electrode sets 130a and being sensed, the sensing electrode 134 in the region could have a larger area ratio and the degree of the driving electrode 132 surrounding the sensing electrode 134 could be enhanced, in order for the touch device 100 to achieve a fine touch-sensing ability. In other embodiments, each sensing electrode 134 and each patterned notch 132a could be other suitable shapes, although the invention is not limited thereto.

In the embodiment, the materials of the driving electrodes 132, the sensing electrodes 134 and the wiring lines 60 could be indium tin oxide (ITO), for instance, although the materials of the driving electrode, the sensing electrode and the wiring line are not limited in the invention. In other embodiments, the afore-described materials could be other suitable electrode materials. Additionally, the touch device 100 of the embodiment could further include a plurality of dummy patterns 140, as shown in FIG. 1. The dummy patterns 140 are disposed on the substrate 120 and located at the gaps between the patterned electrode sets 130a. As described above, through disposing the dummy patterns 140 on the regions that not covered by the driving electrode 132, the sensing electrodes 134 and the wiring lines 60, the touch-sensing layer 130 is more integrated visually. The material of the dummy patterns 140 could be the same as the materials of the driving electrodes 132, the sensing electrodes 134 and the wiring lines 60, such as indium tin oxide (ITO). The material of the dummy patterns 140 could also be other suitable materials, although the invention is not limited thereto.

Figure 3:
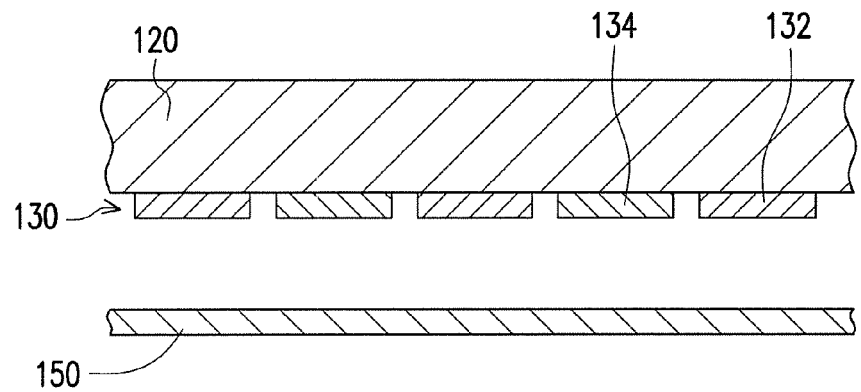
FIG. 3 is an exploded cross-sectional diagram illustrating components of the touch device depicted in FIG. 2 along line I-I.
Figure 4:
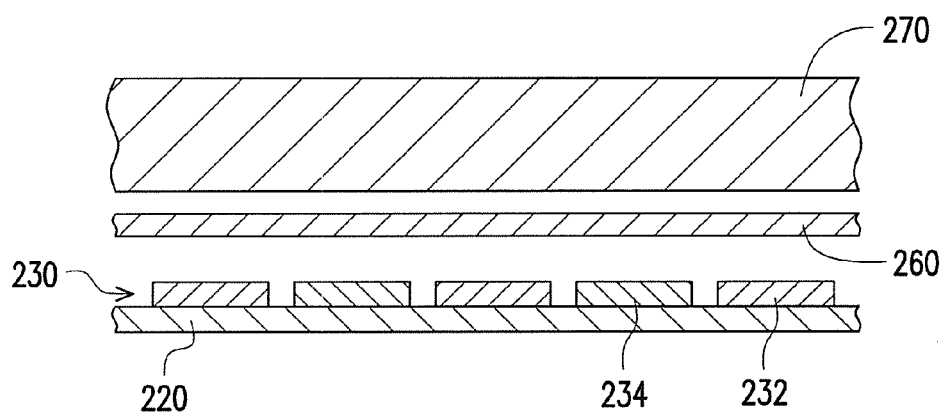
FIG. 4 is an exploded cross-sectional diagram illustrating components of a touch device according to another embodiment of the invention.

FIG. 3 is an exploded cross-sectional diagram illustrating components of the touch device depicted in FIG. 2 along line I-I. Referring to FIG. 3, the substrate 120 of the embodiment is a cover lens of the touch device, for instance, where the touch-sensing layer 130 and the driving electrode 132 and the sensing electrodes 134 thereof are disposed on the cover lens, and a protective film layer 150 is configured to protect the touch-sensing layer 130. The material of the afore-described cover lens could be glass, polymethylmethacrylate (PMMA), polycarbonate (PC), polymethylmethacrylate mixed with polycarbonate or other suitable materials, although the invention is not limited thereto. Additionally, the position arrangement of the touch-sensing layer is not limited in the invention. For instance, the touch-sensing layer could also be configured as the position arrangement shown in FIG. 4. Referring to FIG. 4, the touch-sensing layer 230 and the driving electrode 232 and the sensing electrodes 234 thereof are disposed on the substrate 220, instead of being disposed on the cover lens 270 of the touch device. The optical adhesive layer 260 is configured to adhere the touch-sensing layer 230 and the substrate 220 onto the cover lens 270.

In summary, the embodiments of the invention at least have one of the advantages as follow. In the embodiments of the invention, the plurality of wiring lines in each of the patterned electrode sets are configured as described above, in order for the resistance of the longer wiring lines in each patterned electrode set without being too large. The plurality of the wiring lines in each patterned electrode set are divided into the first group and the second group, in which the lengths of the wiring lines in the first group are greater than the length of the wiring lines in the second group, and the diameters of the wiring lines in the first group are designed to be greater than the diameters of the wiring lines in the second group, where the diameter of the longer wiring line in the first group is designed to be greater than the diameter of the shorter wiring line in the first group. By this way, the resistance of the longer wiring lines in each patterned electrode set could be effectively reduced through the increase of the diameter, so as to prevent the longer wiring lines to affect the correctness of transmitting the touch-sensing signal due to the overly large resistance. Additionally, the wiring lines in each patterned electrode set are located in the same touch-sensing layer with the sensing electrodes and the driving electrode. Accordingly, the total width of the first group is designed to be equal to the total width of the second group, in order to prevent the wiring lines causing any negative effects on the correctness of the touch-sensing, that is, the width of the non-sensing region constituted by the wiring lines of the first group is equal to the width of the non-sensing region constituted by the wiring lines of the second group. By this way, when the touch device performs the calculation and the determination, because of the widths for each non-sensing region in the touch-sensing layer are the same, the misjudgement of the touch recognition system caused by the inconsistent widths of the non-sensing regions could be reduced, and thus a preferable accuracy and efficiency could be achieved. Furthermore, the amount of the wiring lines included in the first group could be designed to be less than the amount of the wiring lines included in the second group, and thus under the circumstances that the diameters of the wiring lines in the first group are all greater than the diameters of the wiring lines in the second group, the total width of the first group equalling to the total width of the second group as described above could be easily produced to minimize the total widths of the first and second groups, thereby taking into account the correctness of transmitting the touch-sensing signal and the efficiency and accuracy of the touch recognition system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention.

It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch device, comprising:
    a circuit board;
    a substrate; and
    a touch-sensing layer, disposed on the substrate, and comprising a plurality of patterned electrode sets, wherein each of the patterned electrode sets comprises:
        a driving electrode, electrically connected to the circuit board; and
        a plurality of sensing electrodes, corresponded to the driving electrode, wherein each of the sensing electrodes has a wiring line, and the wiring line is electrically connected to the circuit board,
    wherein the wiring lines of each of the patterned electrode sets comprises a first group and a second group, where a length for any one of the wiring lines in the first group is greater than a length for any one of the wiring lines in the second group, a diameter for any one of the wiring lines in the first group is greater than a diameter for any one of the wiring lines in the second group, the diameter of the longer wiring line in the first group is greater than the diameter of the shorter wiring line in the first group, the diameters for the wiring lines in the second group are the same, and a total width of the first group equals to a total width of the second group.

2. The touch device according to claim 1, wherein the driving electrode has a plurality of patterned notches, the sensing electrodes are respectively located within the patterned notches and surrounded by the driving electrode, and a shape of each of the patterned openings is corresponded to a shape of each of the sensing electrodes.

3. The touch device according to claim 1, wherein each of the sensing electrodes is in a fish-bone shape.

4. The touch device according to claim 1, wherein each of the patterned electrode sets is in a long-strip shape, and the sensing electrodes are arranged along a length direction of the patterned electrode set.

5. The touch device according to claim 1, wherein the patterned electrode sets are arranged in parallel.

6. The touch device according to claim 1, wherein any two of the wiring lines adjacent to each other in the first group have a gap, and the gaps in the first group are the same.

7. The touch device according to claim 1, wherein any two of the wiring lines adjacent to each other in the second group have a gap, and the gaps in the second group are the same.

8. The touch device according to claim 1, wherein an amount of the wiring lines in the first group is less than an amount of the wiring lines in the second group.

9. The touch device according to claim 1, wherein materials of the driving electrode, the sensing electrodes and the wiring lines comprise indium tin oxide.

10. The touch device according to claim 1, further comprising a plurality of dummy patterns disposed on the substrate and located at gaps between the patterned electrode sets.

* * * * *